United States Patent
Wu et al.

(10) Patent No.: US 9,042,407 B2
(45) Date of Patent: May 26, 2015

(54) DELIVERED-BANDWIDTH ADJUSTMENT METHOD AND MODULE, AND DYNAMIC BANDWIDTH ASSIGNMENT DEVICE

(71) Applicant: HUAWEI TECHNOLOGIES CO., LTD., Shenzhen (CN)

(72) Inventors: Guangdong Wu, Shenzhen (CN); Xianwen Qiu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 187 days.

(21) Appl. No.: 13/705,334

(22) Filed: Dec. 5, 2012

(65) Prior Publication Data

US 2013/0094860 A1    Apr. 18, 2013

Related U.S. Application Data

(63) Continuation of application No. PCT/CN2011/079373, filed on Sep. 6, 2011.

(51) Int. Cl.
*H04J 3/16* (2006.01)
*H04B 10/27* (2013.01)
*H04Q 11/00* (2006.01)

(52) U.S. Cl.
CPC ........ *H04B 10/27* (2013.01); *H04Q 2011/0064* (2013.01); *H04J 3/1694* (2013.01); *H04Q 11/0067* (2013.01)

(58) Field of Classification Search
CPC .................................................. H04B 10/27
USPC ......... 370/252, 229, 401, 412; 398/66, 67, 58
See application file for complete search history.

(56) References Cited

U.S. PATENT DOCUMENTS

| 6,434,164 B1* | 8/2002 | Matsunaga et al. ........... 370/443 |
| 7,209,443 B2* | 4/2007 | Mukai et al. .................. 370/235 |
| 7,680,414 B2* | 3/2010 | Kazawa et al. ................. 398/67 |

(Continued)

FOREIGN PATENT DOCUMENTS

| CN | 101515883 | 8/2009 |
| CN | 101515883 A | 8/2009 |

(Continued)

OTHER PUBLICATIONS

Chinese Office Action mailed Apr. 11, 2013 in corresponding Chinese Application No. 201180001934.1.

(Continued)

*Primary Examiner* — Rasheed Gidado
(74) *Attorney, Agent, or Firm* — Staas & Halsey LLP

(57) ABSTRACT

Embodiments of the present invention provide a delivered-bandwidth adjustment method and module, and a dynamic bandwidth assignment device. The method includes: obtaining a transmission container bandwidth; and adjusting a delivery cycle of a bandwidth delivery stage and a delivered bandwidth of each delivery cycle according to a preset set of bandwidth thresholds and the transmission container bandwidth, where the preset set of bandwidth thresholds include at least two bandwidth thresholds and a delivery cycle corresponding to each bandwidth threshold. Through the technical solutions in the embodiments of the present invention, the delivered bandwidth can be managed effectively, so as to improve the bandwidth utilization and the data transmission efficiency.

14 Claims, 4 Drawing Sheets

(56) References Cited

U.S. PATENT DOCUMENTS

| | | | |
|---|---|---|---|
| 7,764,631 B2 * | 7/2010 | Tang et al. | 370/258 |
| 7,768,936 B2 * | 8/2010 | Siwko et al. | 370/252 |
| 8,081,661 B2 * | 12/2011 | Yoo et al. | 370/468 |
| 8,351,436 B2 * | 1/2013 | Yoon et al. | 370/395.51 |
| 8,634,431 B1 * | 1/2014 | Chiang et al. | 370/412 |
| 2010/0221006 A1 | 9/2010 | Yoon et al. | |
| 2010/0254407 A1 * | 10/2010 | Tanaka et al. | 370/468 |
| 2011/0129223 A1 * | 6/2011 | Yoo et al. | 398/58 |

FOREIGN PATENT DOCUMENTS

| | | |
|---|---|---|
| CN | 101742368 | 6/2010 |
| CN | 102075825 | 5/2011 |
| CN | 102104549 | 6/2011 |
| CN | 102104549 A | 6/2011 |
| WO | WO 2009/069880 | 6/2009 |

OTHER PUBLICATIONS

International Telecommunication Union, ITU-T Recommendation G.983.4, Series G: Transmission Systems and Media, Digital Systems and Networks, "A broadband optical access system with increased service capability using dynamic bandwidth assignment", Nov. 29, 2011, pp. i-83.

International Telecommunication Union, ITU-T Recommendation G.984.3, Series G: Transmission Systems and Media, Digital Systems and Networks, Gigabit-capable Passive Optical Networks (G-PON): Transmission convergence layer specification, Mar. 29, 2008, pp. i-135.

International Search Report of PCT/CN2011/079373 mailed Jun. 14, 2012.

Extended European Search Report mailed Nov. 20, 2013 in corresponding European Application No. 11859658.4.

* cited by examiner

DELIVERED-BANDWIDTH ADJUSTMENT METHOD AND MODULE, AND DYNAMIC BANDWIDTH ASSIGNMENT DEVICE

CROSS-REFERENCE TO RELATED APPLICATIONS

This application is a continuation of International Application No. PCT/CN2011/079373, filed on Sep. 6, 2011, which is hereby incorporated by reference in its entirety.

FIELD OF THE INVENTION

The present invention relates to the field of optical network technologies, and in particular, to a delivered-bandwidth adjustment method and module, and a dynamic bandwidth assignment device.

BACKGROUND OF THE INVENTION

An X-PON system, such as a Gigabit capability Passive Optical Network (Gigabit capability Passive Optical Network, hereinafter referred to as GPON) and an Ethernet Passive Optical Network (Ethernet Passive Optical Network, hereinafter referred to as EPON), is generally formed by an optical network termination (Optical Line Termination, hereinafter referred to as OLT) located in a central office, optical network units (Optical Network Units, hereinafter referred to as ONUs)/optical network terminations (Optical Network Terminations, hereinafter referred to as ONTs) located at a user end, and an optical distribution network (Optical Distribution Network, hereinafter referred to as ODN). The ratio of the number of OLTs in the central office to the number of ONUs at the user end is 1:N. The OLT and the ONUs implement aggregation of the user-end ONUs through optical splitters.

In the XPON system, the OLT in the central office manages authorization of the ONUs in each timeslot, and implements bandwidth management of an uplink ONU. In the prior art, a dynamic bandwidth assignment (Dynamic Bandwidth Assignment, hereinafter referred to as DBA) device implements the function of uplink bandwidth management. The DBA device provides many service bandwidth types for an operator. The DBA device can adjust the bandwidth between the ONUs dynamically according to service traffic requirements of the ONUs and service bandwidth configurations of the ONUs. The DBA device performs bandwidth management based on a transmission container (Transmission Container, hereinafter referred to as TCONT) as a unit. The TCONT serves as a transmission carrier of a service, and all services are transmitted and performed on the TCONT. In the prior art, the DBA device implements the bandwidth management through the following three modules: a collection module, configured to collect TCONT information reported by the TCONT; an assignment module, configured to perform bandwidth calculation and assignment on the collected TCONT information according to a bandwidth priority; and a delivery module, configured to deliver a corresponding assigned bandwidth to an ONU in light of ONU information. Working cycles of the collection module, the assignment module, and the delivery module are the same, and are equal to a DBA cycle. In a stage when the delivery module performs bandwidth delivery, for all TCONT bandwidths, a configured delivery cycle is fixed and constant no matter whether the granularity of the bandwidth is coarse or fine. The delivery cycle is less than or equal to the DBA cycle.

During the implementation of the present invention, the prior art has the following disadvantages: In the prior art, in the stage when the delivery module of the DBA device performs bandwidth delivery, the delivery cycles of all the TCONT bandwidths are fixed, and the delivery cycle is unchangeable in the delivery stage, which lead to a low utilization of the delivered bandwidth and a low data transmission efficiency.

SUMMARY OF THE INVENTION

Embodiments of the present invention provide a delivered-bandwidth adjustment method and module, and a dynamic bandwidth assignment device, to overcome the defects in the prior art that delivery cycles of all TCONT bandwidths are fixed, and the delivery cycle is unchangeable in a delivery process, which lead to a low utilization of a delivered bandwidth and a low data transmission efficiency.

An embodiment of the present invention provides a delivered-bandwidth adjustment method, including:
  obtaining a transmission container bandwidth; and
  adjusting a delivery cycle of a bandwidth delivery stage and a delivered bandwidth of each delivery cycle according to a preset set of bandwidth thresholds and the transmission container bandwidth, where the preset set of bandwidth thresholds includes at least two bandwidth thresholds and a delivery cycle corresponding to each bandwidth threshold, each bandwidth threshold and the corresponding delivery cycle are set according to a buffer size of an optical network unit corresponding to a transmission container, and the transmission container is a transmission container corresponding to the transmission container bandwidth.

An embodiment of the present invention provides a delivered-bandwidth adjustment module, including:
  an obtaining unit, configured to obtain a transmission container bandwidth;
  an adjustment unit, configured to adjust a delivery cycle of a bandwidth delivery stage and a delivered bandwidth of each delivery cycle according to a preset set of bandwidth thresholds and the transmission container bandwidth, where the preset set of bandwidth thresholds includes at least two bandwidth thresholds and a delivery cycle corresponding to each bandwidth threshold, each bandwidth threshold and the corresponding delivery cycle are set according to a buffer size of an optical network unit corresponding to a transmission container, and the transmission container is a transmission container corresponding to the transmission container bandwidth.

An embodiment of the present invention further provides a dynamic bandwidth assignment device, including a collection module, an assignment module, a delivery module, and a delivered-bandwidth adjustment module as mentioned above. The collection module is connected to the assignment module, and the delivered-bandwidth adjustment module is connected respectively to the assignment module and the delivery module.

Through the delivered-bandwidth adjustment method and module and the dynamic bandwidth assignment device in the embodiments of the present invention, the calculated transmission container bandwidth is obtained, the delivery cycle of the bandwidth delivery stage and the delivered bandwidth of each delivery cycle are adjusted according to the preset set of bandwidth thresholds and the transmission container bandwidth, where the preset set of bandwidth thresholds includes at least two bandwidth thresholds and the delivery cycle corresponding to each bandwidth threshold, each bandwidth threshold and the corresponding delivery cycle are set according to the buffer size of the optical network unit corresponding to the transmission container, and the transmission container is a transmission container corresponding to the transmission container bandwidth. Through the technical solutions according to the embodiments of the present invention, a defect in the prior art is changed that a fixed and unchangeable delivery cycle is configured regardless of the granularity of the transmission container bandwidth, and the delivery cycle and the delivered bandwidth of each delivery cycle can be adjusted according to the size of the transmission container bandwidth, so as to effectively manage the delivered bandwidth, and improve the bandwidth utilization and the data transmission efficiency.

BRIEF DESCRIPTION OF THE DRAWINGS

To illustrate the technical solutions according to the embodiments of the present invention or in the prior art more clearly, accompanying drawings to be used in description of the embodiments of the present invention or the prior art are introduced briefly in the following. Apparently, the accompanying drawings in the following show some embodiments of the present invention, and persons of ordinary skill in the art can derive other drawings from these accompanying drawings without creative efforts.

DETAILED DESCRIPTION OF THE EMBODIMENTS

To make objectives, technical solutions and advantages of embodiments of the present invention clearer, the technical solutions in the embodiments of the present invention are described clearly and completely in the following in conjunction with the accompanying drawings in the embodiments of the present invention. Evidently, the embodiments to be described are only part rather than all of the embodiments of the present invention. All other embodiments, which can be derived by persons of ordinary skill in the art based on the embodiments of the present invention without creative efforts, shall fall within the protection scope of the present invention.

Figure 1:
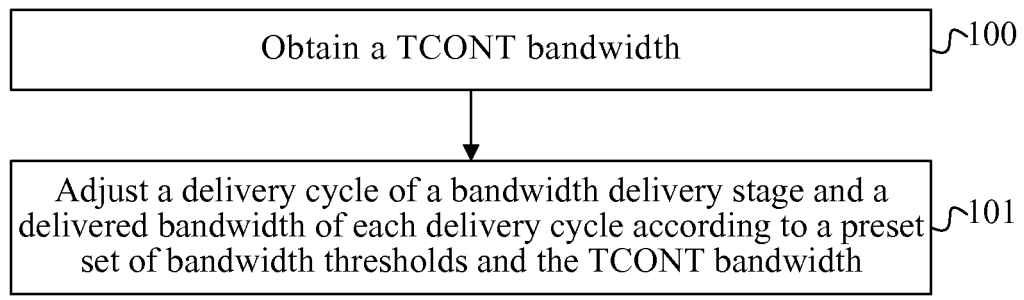
FIG. 1 is a flowchart of a delivered-bandwidth adjustment method according to an embodiment of the present invention.

FIG. 1 is a flowchart of a delivered-bandwidth adjustment method according to an embodiment of the present invention. As shown in FIG. 1, the delivered-bandwidth adjustment method in this embodiment may specifically include the following steps.

100: Obtain a TCONT bandwidth.

101: Adjust a delivery cycle of a bandwidth delivery stage and a delivered bandwidth of each delivery cycle according to a preset set of bandwidth thresholds and the TCONT bandwidth.

In this embodiment, the preset set of bandwidth thresholds includes at least two bandwidth thresholds, and a delivery cycle corresponding to each bandwidth threshold is also set in the preset set of bandwidth thresholds. Each bandwidth threshold and the corresponding delivery cycle are set according to a buffer size of an optical network unit corresponding to a TCONT, and the TCONT is a TCONT corresponding to the TCONT bandwidth.

In this embodiment, the bandwidth delivery stage is a delivery process in which a delivery module in a DBA device delivers, to a corresponding ONU, a TCONT bandwidth assigned by an assignment module. The cycle of the entire delivery stage is a DBA cycle. The DBA cycle includes at least one delivery cycle.

In this embodiment, an executor of the delivered-bandwidth adjustment method may be a delivered-bandwidth adjustment module. Optionally, the delivered-bandwidth adjustment module may be set in an existing DBA device. Optionally, the delivered-bandwidth adjustment module may also be integrated in a delivery module of the DBA device. Through the delivered-bandwidth adjustment method in this embodiment, the calculated TCONT bandwidth is obtained, the delivery cycle of the bandwidth delivery stage and the delivered bandwidth of each delivery cycle are adjusted according to the preset set of bandwidth thresholds and the TCONT bandwidth, where the preset set of bandwidth thresholds includes at least two bandwidth thresholds, and the delivery cycle corresponding to each bandwidth threshold is also set in the preset set of bandwidth thresholds; and each bandwidth threshold and the corresponding delivery cycle are set according to the buffer size of the optical network unit corresponding to the TCONT bandwidth. Through the technical solution of this embodiment, a defect in the prior art is changed that a fixed and unchangeable delivery cycle is configured regardless of the granularity of the TCONT bandwidth, and the delivery cycle and the delivered bandwidth of each delivery cycle can be adjusted according to the size of the TCONT bandwidth, so as to effectively manage the delivered bandwidth, and improve the bandwidth utilization and the data transmission efficiency.

Optionally, each bandwidth threshold and the corresponding delivery cycle in this embodiment may also be specifically set according to the buffer size of the ONU corresponding to the TCONT and a size of the service traffic that can pass the TCONT, which may further improve the setting precision of each bandwidth threshold and the corresponding delivery cycle set in the preset set of bandwidth thresholds.

Figure 2:
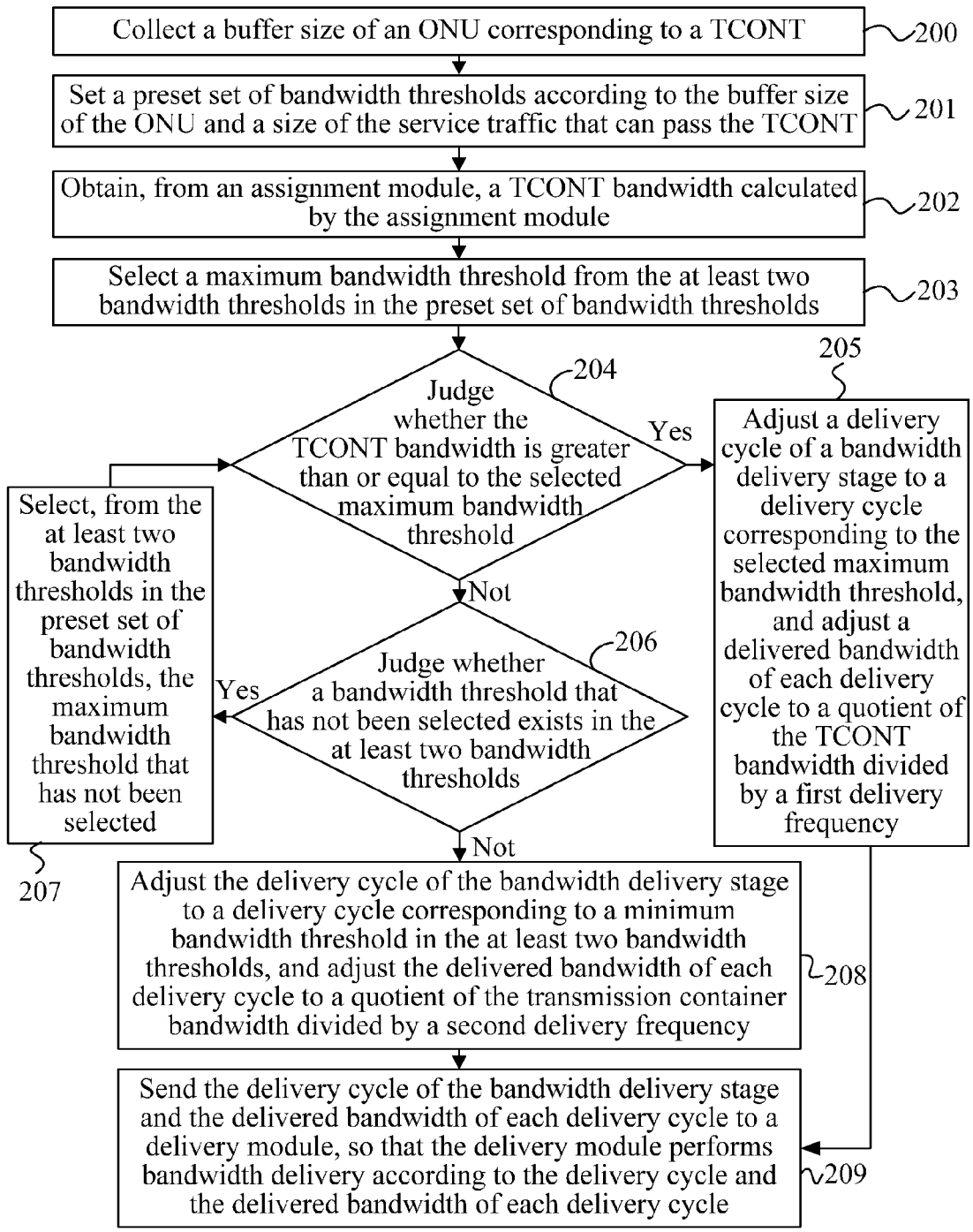
FIG. 2 is a flowchart of a delivered-bandwidth adjustment method according to another embodiment of the present invention.

FIG. 2 is a flowchart of a delivered-bandwidth adjustment method according to another embodiment of the present invention. On the basis of the technical solution shown in FIG. 1, in the delivered-bandwidth adjustment method according to this embodiment, the technical solution of the present invention is further interpreted in detail and further defined. As shown in FIG. 2, the delivered-bandwidth adjustment method in this embodiment may specifically include the following steps.

200: Collect a buffer size of an ONU corresponding to a TCONT, and perform 201.

201: Set a preset set of bandwidth thresholds according to the buffer size of the ONU and a size of the service traffic that can pass the TCONT; and perform 202.

In this embodiment, the preset set of bandwidth thresholds includes at least two bandwidth thresholds. Further, a delivery cycle corresponding to each bandwidth threshold is also set in the preset set of bandwidth thresholds. A product of the bandwidth threshold and the corresponding delivery cycle is not allowed to be greater than or equal to the buffer of the corresponding ONU, and a case is considered that in practice, the traffic may fluctuate and cause a current bandwidth to be greater than or equal to the bandwidth threshold, therefore, each bandwidth threshold may be set to be less than a quotient of the buffer size of the ONU divided by a third delivery frequency when the bandwidth threshold is set, where the third delivery frequency is equal to a quotient of a DBA cycle divided by the delivery cycle corresponding to the bandwidth threshold. Specifically, in a bandwidth delivery stage, the bandwidth threshold corresponds to the number of delivery times. Different bandwidth thresholds correspond to different delivery cycles, that is, correspond to different third delivery frequencies.

202: Obtain, from an assignment module, a TCONT bandwidth calculated by the assignment module, and perform 203.

203: Select a maximum bandwidth threshold from the at least two bandwidth thresholds in the preset set of bandwidth thresholds, and perform 204.

204: Judge whether the TCONT bandwidth is greater than or equal to the selected maximum bandwidth threshold; if the TCONT bandwidth is greater than or equal to the maximum bandwidth threshold, perform 205; or otherwise, if the TCONT bandwidth is less than the maximum bandwidth threshold, perform 206.

205: Adjust a delivery cycle of a bandwidth delivery stage to a delivery cycle corresponding to the selected maximum bandwidth threshold, and adjust a delivered bandwidth of each delivery cycle to a quotient of the TCONT bandwidth divided by a first delivery frequency; and perform 209.

In this embodiment, the first delivery frequency is equal to a quotient of the DBA cycle divided by the delivery cycle corresponding to the selected maximum bandwidth threshold.

206: Judge whether a bandwidth threshold that has not been selected exists in the at least two bandwidth thresholds, and if exists, perform 207; or otherwise, when no maximum bandwidth threshold that has not been selected exists in the at least two bandwidth thresholds, perform 208.

207: Select, from the at least two bandwidth thresholds in the preset set of bandwidth thresholds, the maximum bandwidth threshold that has not been selected, and perform 204.

208: Adjust the delivery cycle of the bandwidth delivery stage to a delivery cycle corresponding to a minimum bandwidth threshold in the at least two bandwidth thresholds, and adjust the delivered bandwidth of each delivery cycle to a quotient of the transmission container bandwidth divided by a second delivery frequency; and perform 209.

In this embodiment, the second delivery frequency is equal to a quotient of the DBA cycle divided by the delivery cycle corresponding to the minimum bandwidth threshold in the at least two bandwidth thresholds.

209: Send the delivery cycle of the bandwidth delivery stage and the delivered bandwidth of each delivery cycle to a delivery module, so that the delivery module performs bandwidth delivery according to the delivery cycle and the delivered bandwidth of each delivery cycle.

Through the delivered-bandwidth adjustment method in this embodiment, a defect in the prior art is changed that a fixed and unchangeable delivery cycle is configured regardless of the granularity of the TCONT bandwidth, and the delivery cycle and the delivered bandwidth of each delivery cycle can be adjusted according to the size of the TCONT bandwidth, so as to effectively manage the delivered bandwidth, and improve the bandwidth utilization and the data transmission efficiency.

For example, through the technical solution in the foregoing embodiment of the present invention, for a TCONT bandwidth with a small value, the number of delivery cycles can be reduced in the adjustment process, so as to prolong the delivery cycle of the TCONT bandwidth, which improves the TCONT service bearing efficiency, reduces the waste of the bandwidth, and reduces a transmission delay of data. For a TCONT bandwidth with a large value, the number of delivery cycles can be increased in the adjustment process, so as to shorten the delivery cycle of the TCONT bandwidth, which improves time of real-time response to the TCONT service, and lowers the dependence of the TCONT on the buffer capability of the ONU.

The delivered-bandwidth adjustment method in the embodiment of the present invention is described in detail in combination with an example.

For example, the calculated TCONT bandwidth obtained from the assignment module of a DBA device is DBA_BW, and the DBA cycle=8 frames. In this embodiment, it may be set that the bandwidth delivery cycle has 4 optional ranges. The delivery cycle is DBA cycle/8, DBA cycle/4, DBA cycle/2, or DBA cycle, and the corresponding delivery frequency is 8, 4, 2, or 1 respectively. Four corresponding delivery cycle thresholds may be: DBA_TH1, DBA_TH2, DBA_TH3, and DBA_TH4 respectively, and the four corresponding delivery cycle thresholds have the following relationship: DBA_TH1>DBA_TH2>DBA_TH3>DBA_TH4. If the delivered bandwidth to be adjusted of each cycle is BWMAP_BW, and the delivery cycle of the delivery stage is NUM_T, the delivery cycle of the bandwidth delivery stage and the delivered bandwidth of each delivery cycle are adjusted and calculated as follows:

a first level of adjustment: if DBA_BW>=DBA_TH1, and corresponding NUM_T=DBA/8, in this case, the delivered bandwidth of each delivery cycle is adjusted as follows: BWMAP_BW=DBA_BW/8;

or else, proceed to a second level of adjustment;

the second level of adjustment: if DBA_BW>=DBA_TH2, and corresponding NUM_T=DBA/4, in this case, the delivered bandwidth of each delivery cycle is adjusted as follows: BWMAP_BW=DBA_BW/4;

or else, proceed to a third level of adjustment;

the third level of adjustment: if DBA_BW>=DBA_TH3, and corresponding NUM_T=DBA/2, in this case, the delivered bandwidth of each delivery cycle is adjusted as follows: BWMAP_BW=DBA_BW/2;

or else, proceed to a fourth level of adjustment;

the fourth level of adjustment: if DBA_BW>=DBA_TH4, and corresponding NUM_T=DBA, in this case, the delivered bandwidth of each delivery cycle is adjusted as follows: BWMAP_BW=DBA_BW;

or else, if DBA_BW<DBA_TH4, and corresponding NUM_T=DBA, in this case, the delivered bandwidth of each delivery cycle is adjusted as follows: BWMAP_BW=DBA_BW, and NUM_T=DBA.

So far, adaptive adjustment of the delivery cycles of all TCONT bandwidths and the delivered bandwidth of each cycle are completed. Through the foregoing adjustment, it can be seen that for a TCONT bandwidth with a large DBA_BW, the delivery cycle of the bandwidth is reduced, and the bandwidth delivery frequency is increased. Therefore, a timely response is made to a bandwidth requirement of the ONU, a delay of response to large-traffic services is improved, and the dependence on the buffer of the ONU is reduced. According to bandwidth bearing efficiency=(bandwidth size—overhead of physical link)/bandwidth size, it can be known that, through the foregoing technical solution, for a TCONT bandwidth with a small DBA_BW, the frequency of delivering the bandwidth is reduced, which causes small bandwidths to be accumulated, so as to improve the bandwidth bearing efficiency of the small bandwidths, thereby fulfilling a higher requirement for service delay response.

In a word, through the technical solution of the delivered-bandwidth adjustment method in the foregoing embodiment, the delivery cycle and the delivered bandwidth of each delivery cycle can be adjusted according to a size of the TCONT bandwidth, so as to effectively manage the delivered bandwidth, and improve the bandwidth utilization and the data transmission efficiency.

Figure 3:
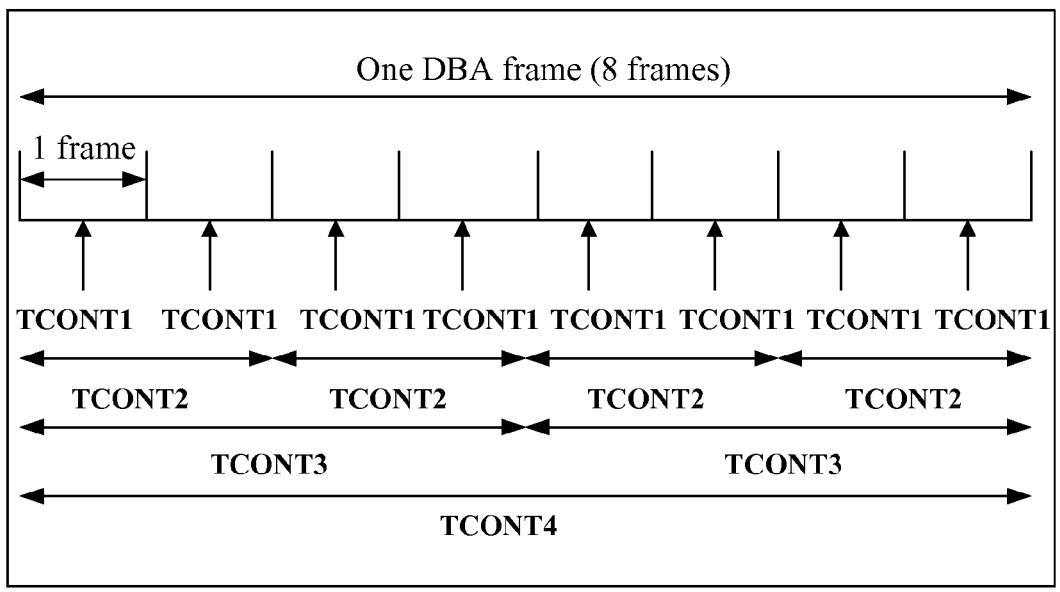
FIG. 3 is a schematic diagram of a relation between a TCONT bandwidth and a delivery cycle.

Through the technical solution of the delivered-bandwidth adjustment method in the foregoing embodiment, different TCONT bandwidths correspond to different delivery cycles. For example, FIG. 3 is a schematic diagram of a relation between a TCONT bandwidth and a delivery cycle. As shown in FIG. 3, in a DBA cycle, that is, an 8-frame period, a delivery cycle of TCONT1 is 8 times, a delivery cycle of TCONT2 is 4 times, a delivery cycle of TCONT3 is 2 times, and a delivery cycle of TCONT4 is 1 time.

Persons of ordinary skill in the art can understand that all or part of the steps of the foregoing method embodiments may be implemented by a program instructing relevant hardware. The program may be stored in a computer readable storage medium. When the program is executed, the steps of the foregoing method embodiments are performed. The storage medium may include various media capable of storing program codes, such as a ROM, a RAM, a magnetic disk, or an optical disk.

Figure 4:
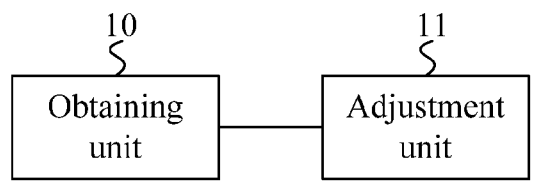
FIG. 4 is a schematic structural diagram of a delivered-bandwidth adjustment module according to an embodiment of the present invention.

FIG. 4 is a schematic structural diagram of a delivered-bandwidth adjustment module according to an embodiment of the present invention. As shown in FIG. 4, the delivered-bandwidth adjustment module in this embodiment may specifically include an obtaining unit 10 and an adjustment unit 11.

The obtaining unit 10 is configured to obtain a TCONT bandwidth, and the adjustment unit 11 is connected to the obtaining unit 10. The adjustment unit 11 is configured to adjust a delivery cycle of a bandwidth delivery stage and a delivered bandwidth of each delivery cycle according to a preset set of bandwidth thresholds and the TCONT bandwidth obtained by the obtaining unit 10. The preset set of bandwidth thresholds includes at least two bandwidth thresholds, and a delivery cycle corresponding to each bandwidth threshold is also set in the preset set of bandwidth thresholds. Each bandwidth threshold and the corresponding delivery cycle are set according to a buffer size of an ONU corresponding to a TCONT, and the TCONT is a TCONT corresponding to the TCONT bandwidth.

In the delivered-bandwidth adjustment module in this embodiment, a mechanism of using the foregoing units for adjusting the delivered bandwidth is the same as that in the foregoing related method embodiments. Reference may be made to the foregoing related method embodiments for details, which are not repeated here.

In the delivered-bandwidth adjustment module in this embodiment, the foregoing units are used to obtain the calculated TCONT bandwidth, and adjust the delivery cycle of the bandwidth delivery stage and the delivered bandwidth of each delivery cycle according to the preset set of bandwidth thresholds and the TCONT bandwidth, where the preset set of bandwidth thresholds includes at least two bandwidth thresholds and the delivery cycle corresponding to each bandwidth threshold, and each bandwidth threshold and the corresponding delivery cycle are set according to the buffer size of the ONU corresponding to the TCONT. Through the technical solution in this embodiment, a defect in the prior art is changed that a fixed and unchangeable delivery cycle is configured regardless of the granularity of the TCONT bandwidth is changed, and the delivery cycle and the delivered bandwidth of each delivery cycle can be adjusted according to the size of the TCONT bandwidth, so as to effectively manage the delivered bandwidth, and improve the bandwidth utilization and the data transmission efficiency.

Optionally, in the delivered-bandwidth adjustment module in the foregoing embodiment, each bandwidth threshold and the corresponding delivery cycle may be specifically set according to the buffer size of the ONU corresponding to the TCONT and a size of the service traffic that can pass the TCONT.

Figure 5:
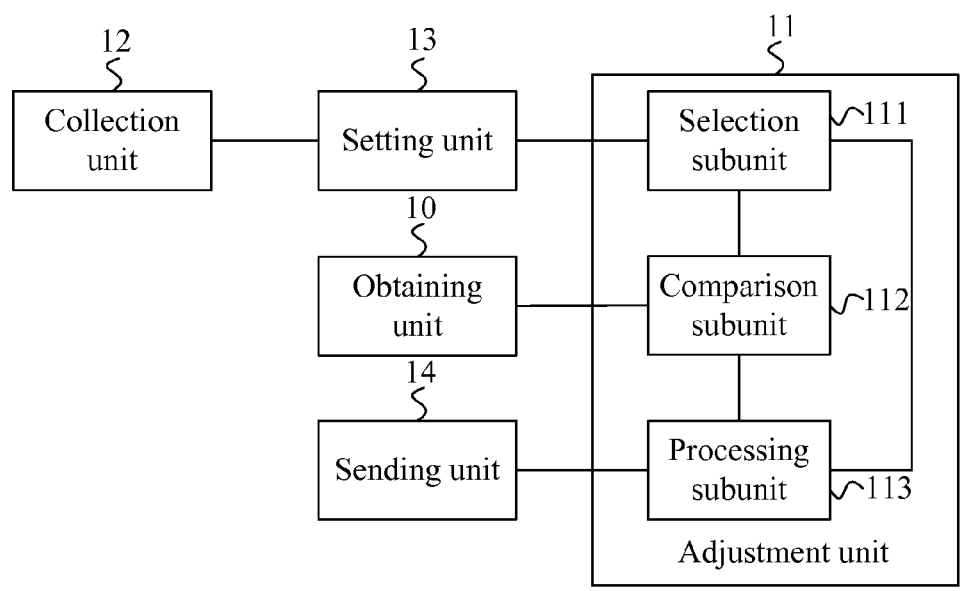
FIG. 5 is a schematic structural diagram of a delivered-bandwidth adjustment module according to another embodiment of the present invention.

FIG. 5 is a schematic structural diagram of a delivered-bandwidth adjustment module according to another embodiment of the present invention. As shown in FIG. 5, on the basis of the embodiment shown in FIG. 4, the delivered-bandwidth adjustment module in this embodiment may further include the following technical solution.

In the delivered-bandwidth adjustment module in this embodiment, an adjustment unit 11 may specifically include a selection subunit 111, a comparison subunit 112, and a processing subunit 113. The selection subunit 111 is configured to select, from at least two bandwidth thresholds, a maximum bandwidth threshold that has not been selected. The comparison subunit 112 is respectively connected to the selection subunit 111 and an obtaining unit 10. The comparison subunit 112 is configured to compare a TCONT bandwidth obtained by the obtaining unit 10 with the maximum bandwidth threshold selected by the selection subunit 111, when the selection subunit 111 selects, from the at least two bandwidth thresholds, the maximum bandwidth threshold that has not been selected. The processing subunit 113 is connected respectively to the comparison subunit 112 and the selection subunit 111. The processing subunit 113 is configured to, according to a result of the comparison of the comparison subunit 112, adjust a delivery cycle of a bandwidth delivery stage to a delivery cycle corresponding to the maximum bandwidth threshold selected by the selection subunit 111, and adjust a delivered bandwidth of each delivery cycle to a quotient of the TCONT bandwidth divided by a first delivery frequency when the TCONT bandwidth is greater than or equal to the maximum bandwidth threshold, where the first delivery frequency is equal to a quotient of a DBA cycle divided by the delivery cycle corresponding to the maximum bandwidth threshold selected by the selection subunit 111; or otherwise, when the TCONT bandwidth is less than the maximum bandwidth threshold, the processing subunit 113 triggers the selection subunit 111 to continue the selection until the at least two bandwidth thresholds include no maximum bandwidth threshold that has not been selected, adjust the delivery cycle of the bandwidth delivery stage to a delivery cycle corresponding to a minimum bandwidth threshold in the at least two bandwidth thresholds, and adjust the delivered bandwidth of each delivery cycle to a quotient of the TCONT bandwidth divided by a second delivery frequency, where the second delivery frequency is equal to a quotient of the DBA cycle divided by the delivery cycle corresponding to the minimum bandwidth threshold in the at least two bandwidth thresholds.

Optionally, as shown in FIG. 5, the delivered-bandwidth adjustment module in this embodiment further includes a collection unit 12 and a setting unit 13. The collection unit 12 is configured to collect a buffer size of an ONU corresponding to a TCONT. The setting unit 13 is connected to the collection unit 12. The setting unit 13 is configured to set a preset set of bandwidth thresholds according to the buffer size of the ONU collected by the collection unit 12, where the preset set of bandwidth thresholds includes the at least two bandwidth thresholds and the delivery cycle corresponding to each bandwidth threshold, each bandwidth threshold is less than a quotient of the buffer size of the ONU divided by a third delivery frequency corresponding to the bandwidth threshold, and the third delivery frequency is equal to a quotient of the DBA cycle divided by a delivery cycle corresponding to the corresponding bandwidth threshold. In this case, the corresponding selection subunit 111 may be connected to the setting unit 13, and the selection subunit 111 is specifically configured to select, from the at least two bandwidth thresholds in the preset set of bandwidth thresholds set by the setting unit 13, the maximum bandwidth threshold that has not been selected.

Further, optionally, the setting unit 13 may specifically be configured to set the preset set of bandwidth thresholds according to the buffer size and a size of the service traffic that can pass the TCONT. In this way, the setting precision of each bandwidth threshold and the corresponding delivery cycle in the preset set of bandwidth thresholds is further improved.

Optionally, the obtaining unit 10 in the delivered-bandwidth adjustment module in this embodiment is configured to obtain, from the assignment module, the TCONT bandwidth calculated by the assignment module.

Optionally, as shown in FIG. 5, the delivered-bandwidth adjustment module in this embodiment further includes a sending unit 14. The sending unit 14 may specifically be connected to the processing subunit 113 in the adjustment unit 11, and the sending unit 14 is configured to send the delivery cycle of the bandwidth delivery stage and the delivered bandwidth of each delivery cycle obtained through processing by the processing subunit 113 to the delivery module, so that the delivery module performs bandwidth delivery according to the delivery cycle and the delivered bandwidth of each delivery cycle.

In the delivered-bandwidth adjustment module in this embodiment, an example in which multiple optional technical solutions exist concurrently is used. In practical applications, any combination of the foregoing multiple optional solutions may be used as a separate embodiment.

In the delivered-bandwidth adjustment module in this embodiment, a mechanism of using the foregoing units for adjusting the delivered bandwidth is the same as the foregoing related method embodiment. Reference may be made to the foregoing related method embodiment for details, which are not repeated here.

In the delivered-bandwidth adjustment module in this embodiment, the foregoing units are used to change a defect in the prior art that a fixed and unchangeable delivery cycle is configured regardless of the granularity of the TCONT bandwidth, and the delivery cycle and the delivered bandwidth of each delivery cycle can be adjusted according to the size of the TCONT bandwidth, so as to effectively manage the delivered bandwidth, and improve the bandwidth utilization and the data transmission efficiency.

Figure 6:
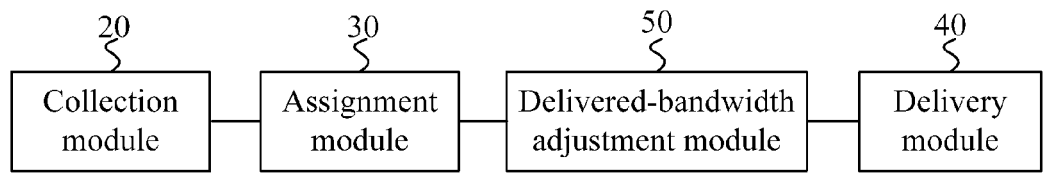
FIG. 6 is a schematic structural diagram of a dynamic bandwidth assignment device according to an embodiment of the present invention.

FIG. 6 is a schematic structural diagram of a dynamic bandwidth assignment device according to an embodiment of the present invention. As shown in FIG. 6, the dynamic bandwidth assignment device in this embodiment includes a collection module 20, an assignment module 30, a delivery module 40, and a delivered-bandwidth adjustment module 50.

The dynamic bandwidth assignment device in this embodiment is equivalent to an existing dynamic bandwidth assignment device with a delivered-bandwidth adjustment module 50 being added. As shown in FIG. 6, the delivered-bandwidth adjustment module 50 is connected between the assignment module 30 and the delivery module 40 to manage a delivered bandwidth of a TCONT. Specifically, the delivered-bandwidth adjustment module 50 may be the delivered-bandwidth adjustment module shown in FIG. 4 or FIG. 5.

The collection module 20 is configured to collect TCONT information reported by the TCONT. The assignment module 30 is connected to the collection module 20, and the assignment module 30 is configured to perform bandwidth calculation and assignment according to the TCONT information collected by the collection module 20, and obtain a TCONT bandwidth. The delivered-bandwidth adjustment module 50 is configured to adjust a delivery cycle of a bandwidth delivery stage and a delivered bandwidth of each delivery cycle according to a preset set of bandwidth thresholds and the TCONT bandwidth calculated by the assignment module 30, where the preset set of bandwidth thresholds includes at least two bandwidth thresholds, and a delivery cycle corresponding to each bandwidth threshold is also set in the preset set of bandwidth thresholds, and each bandwidth threshold and the corresponding delivery cycle are set according to a buffer size of an optical network unit corresponding to the TCONT bandwidth. The delivered-bandwidth adjustment module 50 is further configured to send the delivery cycle of the bandwidth delivery stage and the delivered bandwidth of each delivery cycle, which are obtained through adjustment, to the delivery module 40. The delivery module 40 is configured to receive the delivery cycle of the bandwidth delivery stage and the delivered bandwidth of each delivery cycle from the delivered-bandwidth adjustment module 50, and perform bandwidth delivery according to the delivery cycle and the delivered bandwidth of each delivery cycle. For the specific implementation of the collection module 20, the assignment module 30, and the delivery module 40, reference may be made to the prior art, and details are not repeated here.

In the dynamic bandwidth assignment device in this embodiment, the foregoing delivered-bandwidth adjustment module is used to change a defect in the prior art that a fixed and unchangeable delivery cycle is configured regardless of the granularity of the TCONT bandwidth, and the delivery cycle and the delivered bandwidth of each delivery cycle can be adjusted according to the size of the TCONT bandwidth, so as to effectively manage the delivered bandwidth, and improve the bandwidth utilization and the data transmission efficiency.

The apparatus embodiments described above are merely illustrative. The units described as stand-alone components may be separated physically or not; and the components shown as units may be physical units or not, that is, they may be located in one place, or distributed on at least two network elements. Part or all of the modules may be selected according to actual requirements to fulfill the objectives of the technical solutions according to the embodiments, which can be understood and implemented by persons of ordinary skill in the art without creative efforts.

Finally, it should be noted that the foregoing embodiments are merely used for describing the technical solutions of the present invention, but not intended to limit the present invention. Although detailed illustration is made with reference to the foregoing embodiments, persons of ordinary skill in the art should understand that they still can make modifications to the technical solutions recorded in the foregoing embodiments, or equivalent replacements to part of the technical features. These modifications or equivalent replacements do not make corresponding technical solutions depart from the spirit and scope of the technical solutions in the embodiments of the present invention.

What is claimed is:

1. A delivered-bandwidth adjustment method, comprising:
   obtaining a transmission container bandwidth; and
   adjusting a delivery cycle of a bandwidth delivery stage and a delivered bandwidth of each delivery cycle according to at least two bandwidth thresholds and the transmission container bandwidth, and
   wherein the adjusting enables the delivery cycle to vary in correspondence with a size of the transmission container bandwidth relative to said one of the at least two bandwidth thresholds having a corresponding delivery cycle according to a buffer size of an optical network unit corresponding to a transmission container, and the transmission container is a transmission container corresponding to the transmission container bandwidth.

2. The method according to claim 1, wherein each bandwidth threshold and the corresponding delivery cycle are specifically set according to the buffer size of the optical network unit corresponding to the transmission container and a size of a service traffic that passes the transmission container.

3. The method according to claim 1, wherein:
   the adjusting the delivery cycle of the bandwidth delivery stage and the delivered bandwidth of each delivery cycle according to the at least two bandwidth thresholds and the transmission container bandwidth comprises:
   selecting, from the at least two bandwidth thresholds, a maximum bandwidth threshold that has not been selected; and
   comparing the transmission container bandwidth with the maximum bandwidth threshold; when the transmission container bandwidth is greater than or equal to the maximum bandwidth threshold, adjusting the delivery cycle of the bandwidth delivery stage to a delivery cycle corresponding to the maximum bandwidth threshold, and adjusting the delivered bandwidth of each delivery cycle to a quotient of the transmission container bandwidth divided by a first delivery frequency, wherein the first delivery frequency is equal to a quotient of a dynamic bandwidth assignment cycle divided by the delivery cycle corresponding to the maximum bandwidth threshold; or otherwise, when the transmission container bandwidth is less than the maximum bandwidth threshold, returning to and continuously performing the selecting, from the at least two bandwidth thresholds, the maximum bandwidth threshold that has not been selected, until the at least two bandwidth thresholds comprise no maximum bandwidth threshold that has not been selected, adjusting the delivery cycle of the bandwidth delivery stage to a delivery cycle corresponding to a minimum bandwidth threshold in the at least two bandwidth thresholds, and adjusting the delivered bandwidth of each delivery cycle to a quotient of the transmission container bandwidth divided by a second delivery frequency, wherein the second delivery frequency is equal to a quotient of the dynamic bandwidth assignment cycle divided by the delivery cycle corresponding to the minimum bandwidth threshold in the at least two bandwidth thresholds.

4. The method according to claim 3, further comprising:
   collecting the buffer size of the optical network unit corresponding to the transmission container; and
   setting the of at least two bandwidth thresholds according to the buffer size, wherein the of at least two bandwidth thresholds comprises the at least two bandwidth thresholds and the delivery cycle corresponding to each bandwidth threshold, each bandwidth threshold is less than a quotient of the buffer size of the optical network unit divided by a third delivery frequency corresponding to the bandwidth threshold, and the third delivery frequency is equal to a quotient of the dynamic bandwidth assignment cycle divided by the delivery cycle corresponding to the bandwidth threshold.

5. The method according to claim 4, wherein the setting the of at least two bandwidth thresholds according to the buffer size specifically comprises setting the of at least two bandwidth thresholds according to the buffer size and a size of the service traffic that passes the transmission container.

6. The method according to claim 1, wherein the obtaining the transmission container bandwidth comprises:
   obtaining, from computer hardware configured to implement an assignment module, the transmission container bandwidth calculated by the assignment module.

7. The method according to claim 1, further comprising:
   sending the delivery cycle of the bandwidth delivery stage and the delivered bandwidth of each delivery cycle to computer hardware configured to implement a delivery module, so that the delivery module performs bandwidth delivery according to the delivery cycle and the delivered bandwidth of each delivery cycle.

8. A delivered-bandwidth adjustment module, comprising:
   a non-transitory computer readable storage medium to store at least one program, and
   computer hardware configured to implement, including configured by the at least one program to implement:
   an obtaining unit, configured to obtain a transmission container bandwidth; and
   an adjustment unit, configured to adjust a delivery cycle of a bandwidth delivery stage and a delivered bandwidth of each delivery cycle according to at least two bandwidth thresholds and the transmission container bandwidth, and
   wherein the delivery cycle is enabled to vary in correspondence with a size of the transmission container bandwidth relative to said one of the at least two bandwidth thresholds having a corresponding delivery cycle are set according to a buffer size of an optical network unit corresponding to a transmission container, and the transmission container is a transmission container corresponding to the transmission container bandwidth.

9. The module according to claim 8, wherein each bandwidth threshold and the corresponding delivery cycle are specifically set according to the buffer size of the optical network unit corresponding to the transmission container and a size of a service traffic that passes the transmission container.

10. The module according to claim 8, wherein the adjustment unit comprises:
    a selection subunit, configured to select, from the at least two bandwidth thresholds, a maximum bandwidth threshold that has not been selected;
    a comparison subunit, configured to compare the transmission container bandwidth with the maximum bandwidth threshold selected by the selection subunit, when the selection subunit selects, from the at least two bandwidth thresholds, the maximum bandwidth threshold that has not been selected;
    a processing subunit, configured to, according to a result of the comparison of the comparison subunit, adjust the delivery cycle of the bandwidth delivery stage to a delivery cycle corresponding to the maximum bandwidth threshold, and adjust the delivered bandwidth of each delivery cycle to a quotient of the transmission container bandwidth divided by a first delivery frequency when the transmission container bandwidth is greater than or equal to the maximum bandwidth threshold, wherein the first delivery frequency is equal to a quotient of a dynamic bandwidth assignment cycle divided by the delivery cycle corresponding to the maximum bandwidth threshold; or otherwise, when the transmission container bandwidth is less than the maximum bandwidth threshold, trigger the selection subunit to continue the selection until the at least two bandwidth thresholds comprise no maximum bandwidth threshold that has not been selected, adjust the delivery cycle of the bandwidth delivery stage to a delivery cycle corresponding to a minimum bandwidth threshold in the at least two bandwidth thresholds, and adjust the delivered bandwidth of each delivery cycle to a quotient of the transmission container bandwidth divided by a second delivery frequency, wherein the second delivery frequency is equal to a quotient of the dynamic bandwidth assignment cycle divided by the delivery cycle corresponding to the minimum bandwidth threshold in the at least two bandwidth thresholds.

11. The module according to claim 10, further comprising:
a collection unit, configured to collect the buffer size of the optical network unit corresponding to the transmission container;
a setting unit, configured to set the of at least two bandwidth thresholds according to the buffer size, wherein the of at least two bandwidth thresholds comprises the at least two bandwidth thresholds and the delivery cycle corresponding to each bandwidth threshold, each bandwidth threshold is less than a quotient of the buffer size of the optical network unit divided by a third delivery frequency corresponding to the bandwidth threshold, and the third delivery frequency is equal to a quotient of the dynamic bandwidth assignment cycle divided by the delivery cycle corresponding to the bandwidth threshold.

12. The module according to claim 11, wherein the setting unit is specifically configured to set the of at least two bandwidth thresholds according to the buffer size and a size of the service traffic that passes the transmission container, wherein the of at least two bandwidth thresholds comprises the at least two bandwidth thresholds and the delivery cycle corresponding to each bandwidth threshold, each bandwidth threshold is less than the quotient of the buffer size of the optical network unit divided by the third delivery frequency corresponding to the bandwidth threshold, and the third delivery frequency is equal to the quotient of the dynamic bandwidth assignment cycle divided by the delivery cycle corresponding to the bandwidth threshold.

13. The module according to claim 8, wherein the obtaining unit is configured to obtain, from the assignment module, the transmission container bandwidth calculated by the assignment module.

14. The module according to claim 8, further comprising:
a sending unit, configured to send the delivery cycle of the bandwidth delivery stage and the delivered bandwidth of each delivery cycle to the delivery module, so that the delivery module performs bandwidth delivery according to the delivery cycle and the delivered bandwidth of each delivery cycle.

* * * * *

UNITED STATES PATENT AND TRADEMARK OFFICE
CERTIFICATE OF CORRECTION

PATENT NO. : 9,042,407 B2  
APPLICATION NO. : 13/705334  
DATED : May 26, 2015  
INVENTOR(S) : Guangdong Wu et al.

Page 1 of 1

It is certified that error appears in the above-identified patent and that said Letters Patent is hereby corrected as shown below:

In the claims

Claim 4, Column 11, Line 63: After "setting the" delete "of", therefor.

Claim 4, Column 11, Line 64: After "setting the" delete "of", therefor.

Claim 5, Column 12, Line 9: After "setting the" delete "of", therefor.

Claim 11, Column 13, Line 27: After "setting the" delete "of", therefor.

Claim 11, Column 13, Line 29: After "setting the" delete "of", therefor.

Claim 12, Column 14, Line 8: After "setting the" delete "of", therefor.

Claim 12, Column 14, Line 11: After "setting the" delete "of", therefor.

Signed and Sealed this  
Thirteenth Day of October, 2015

Michelle K. Lee  
*Director of the United States Patent and Trademark Office*